US012770412B2

(12) United States Patent
Weyers et al.

(10) Patent No.: US 12,770,412 B2
(45) Date of Patent: Oct. 20, 2026

(54) VISUAL DETECTION OF HANDS ON STEERING WHEEL

(71) Applicant: Aptiv Technologies AG, Schaffhausen (CH)

(72) Inventors: Patrick Weyers, Schaffhausen (CH); David Schiebener, Schaffhausen (CH)

(73) Assignee: Aptiv Technologies AG, Schaffhausen (CH)

( * ) Notice: Subject to any disclaimer, the term of this patent is extended or adjusted under 35 U.S.C. 154(b) by 244 days.

(21) Appl. No.: 18/621,460

(22) Filed: Mar. 29, 2024

(65) Prior Publication Data

US 2024/0331410 A1 Oct. 3, 2024

(30) Foreign Application Priority Data

Mar. 30, 2023 (EP) .................................... 23165688

(51) Int. Cl.

| | |
|---|---|
| ***G06V 20/59*** | (2022.01) |
| ***G06T 7/10*** | (2017.01) |
| ***G06T 7/70*** | (2017.01) |
| ***G06V 10/25*** | (2022.01) |
| ***G06V 10/764*** | (2022.01) |
| ***G06V 40/10*** | (2022.01) |

(52) U.S. Cl.

CPC .............. *G06V 20/597* (2022.01); *G06T 7/10* (2017.01); *G06T 7/70* (2017.01); *G06V 10/25* (2022.01); *G06V 10/764* (2022.01); *G06V 40/107* (2022.01); *G06T 2207/20132* (2013.01)

(58) Field of Classification Search

None

See application file for complete search history.

(56) References Cited

U.S. PATENT DOCUMENTS

2020/0320737 A1* 10/2020 Schiebener ............... G06T 7/74
2021/0078609 A1* 3/2021 Barth .................... B60W 40/08
2022/0203996 A1 6/2022 Katz

FOREIGN PATENT DOCUMENTS

AU 2021106921 A4 11/2021
WO 2021020905 A1 2/2021

OTHER PUBLICATIONS

Extended European Search Report for EP23165688.5, 8 pages, Sep. 18, 2023.

* cited by examiner

*Primary Examiner* — Leon Viet Q Nguyen
(74) *Attorney, Agent, or Firm* — Miller Johnson

(57) ABSTRACT

A computer-implemented method for driving assistance in a vehicle. The method includes determining, based on an image capturing an operating element of the vehicle and a driver of the vehicle, a distance between the operating element and a hand of the driver. In response to the distance meeting a criterion being indicative of a possibility that the driver operates the operating element, the method includes: determining, based on a part of the image capturing the operating element, classification information of the operating element, determining, based on a part of the image capturing the driver, classification information of a pose of the driver, and determining, based on the distance, the classification information of the operating element and the classification information of the pose of the driver, whether the driver operates the operating element.

13 Claims, 13 Drawing Sheets

VISUAL DETECTION OF HANDS ON STEERING WHEEL

CROSS-REFERENCE TO RELATED APPLICATIONS

This application claims priority to EP 23 165 688 filed Mar. 30, 2023, the entire disclosure of which is incorporated by reference.

FIELD

The subject disclosure generally relates to driving assistance in a vehicle. More specifically, the subject disclosure relates to methods, apparatuses, and systems for determining whether a driver of the vehicle operates an operating element of the vehicle. The methods, apparatuses and systems of the subject disclosure are for use in advanced driving assistance systems and autonomous driving systems for vehicles.

BACKGROUND

In recent years, development in the field of driver assistance systems and systems for autonomous driving has advanced. The use of such systems in vehicles serves to support the driver and, for example, to detect and prevent dangerous situations. Driving assistance systems are now ubiquitous and, in some cases, even mandatory.

Current driver assistance systems and systems for autonomous driving require a driver to monitor the surroundings of the vehicle and be constantly ready to take over control of the vehicle. To monitor the readiness of the driver to take over the control of the vehicle different techniques have been proposed. One of these techniques include the detection of whether the driver is holding an operating element for operating the vehicle such as steering wheel. Such techniques are typically based on sensors built in the operating element or on detecting movements of the operating element. However, these techniques can be fooled easily e.g. by the driver putting a knee under the operating element to simulate holding the operating element.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In order to improve the known techniques, camera-based solutions have been developed. The camera-based solutions are not based on sensors built in the operating element or on detecting movements of the operating element but use cameras to detect whether the driver is holding the operating element. Such solutions are more difficult to fool because putting the knee under the operating element to simulate holding the operating element may be detected using the camera.

The subject disclosure is directed to improve driving assistance in a vehicle. The main aspects are set out by the independent claims.

According to a first aspect of the subject disclosure, a computer-implemented method for driving assistance in a vehicle is provided. The method may be performed by a processing apparatus. The method comprises: determining, based on an image capturing an operating element of the vehicle and a driver of the vehicle, a distance between the operating element and a hand of the driver; and in response to the distance meeting a criterion being indicative of a possibility that the driver operates the operating element: determining, based on a part of the image capturing the operating element, classification information of the operating element; determining, based on a part of the image capturing the driver, classification information of a pose of the driver; and determining, based on the distance, the classification information of the operating element and the classification information of the pose of the driver, whether the driver operates the operating element.

In some examples of the first aspect, the method further comprises: defining a region in the image including at least a part of the operating element or detecting, using a detection network trained to locate parts of the operating element, the region including at least the part of the operating element; and determining, based on the region, the location of the operating element.

In some examples of the first aspect, the method further comprises: determining, based on a plurality of body keypoints of the driver, one or more body keypoints indicating the hand of the driver; and determining, based on the one or more body keypoints, the location of the hand.

In some examples of the first aspect, the hand comprises a left hand and a right hand of the driver. In these examples, determining the distance comprises determining a distance between the operating element and the left hand and a distance between the operating element and the right hand separately. In such examples, the distance may be determined for the left hand and the right hand separately.

In some examples of the first aspect, the location of the operation element and the location of the hand is determined with respect to a reference coordinate system for the vehicle. In these examples, determining the distance comprises calculating a Euclidian distance with respect to the reference coordinate system.

In some examples of the first aspect, determining classification information of the operating element comprises: classifying, using a classification network for detecting operating of the operating element, the part of the image to detect whether the hand of the driver is located proximate to the operating element so as to allow operating the operating element; and determining, based on the classifying, the classification information of the operating element indicating whether the driver operates the operating element. In such examples, the classification network for detecting operating of the operating element may be trained to detect whether the hand of the driver captured in the image can be located proximate to the operating element.

In some examples of the first aspect, determining classification information of the pose of the driver comprises: classifying, using a classification network for detecting a body pose of the driver, the driver captured in the image to detect the body pose of the driver; and determining, based on the classifying, the classification information indicating whether the body pose of the driver is to allow the driver operating the operating element. In such examples, the classification network of the body pose of the driver may be trained to detect, based on a plurality of body keypoints of the driver, body poses of the driver captured in the image.

In some examples of the first aspect, determining classification information of the pose of the driver comprises: classifying, using a classification network for detecting a hand pose of the driver, the driver captured in the image to detect the hand pose of the driver; and determining, based on the classifying, the classification information indicating whether the hand pose of the driver is to allow operating the operating element. In such examples, the classification network for detecting the hand pose of the driver may be trained to detect, based on a plurality of body keypoints related to the hand of the driver, hand poses of the driver captured in the part of the image.

In some examples of the first aspect, determining classification information of the pose of the driver comprises: classifying, using a classification network for detecting an object in the hand of the driver, the driver captured in the image to detect whether there is the object in the hand of the driver; and determining, based on the classifying, the classification information indicating whether there is the object in the hand to derive whether the driver can operate the operating element. In such examples, the classification network for detecting the object in the hand of the driver may be trained to detect objects held in the hand of the driver captured in the part of the image.

In some examples of the first aspect, the method further comprises: cropping, based on the location of the operating element, the image to generate the part of the image capturing the operating element.

In some examples of the first aspect, the method further comprises: cropping, based on a plurality of body keypoints of the driver and/or using a classification network for detecting at least a part of the driver in the image, the image to generate the part of the image capturing at least the part of the driver.

In some examples of the first aspect, the method further comprises: determining, based on the image capturing the driver, a plurality of body keypoints of the driver.

In some examples of the first aspect, determining whether the driver operates the operating element comprises: weighting the distance, the classification information of the operating element and the classification information of the pose of the driver.

In some examples of the first aspect, the method further comprises: determining whether the distance meets the criterion, the criterion being indicative of whether the hand of the driver is located proximate to the operating element so as to allow operating the operating element. In such examples, determining whether the distance meets the criterion may comprise: determining whether the hand of the driver is located within a region of the image including the operating element to determine that the distance meets the criterion.

In some examples of the first aspect, the method further comprises: generating a control signal for driving assistance indicating whether the driver operates the operating element.

In some examples of the first aspect, the method further comprises: taking the image by using a sensor of the vehicle.

In some examples of the first aspect, the operating element comprises a steering wheel of the vehicle.

According to a second aspect of the subject disclosure, a processing apparatus is provided. The processing apparatus comprises a processor configured to perform the method according to the first aspect and embodiments thereof. Alternatively, or additionally, the processing apparatus may comprise a processor and a memory including computer program code. The computer program code, when executed with the processor, causes the processing apparatus to perform the method according to the first aspect and embodiments thereof. Alternatively, or additionally, the processing apparatus may comprise one or more means configured to perform the method according to the first aspect and embodiments thereof.

According to a third aspect, another processing apparatus is provided. The processing apparatus comprises a distance determining component for determining, based on an image capturing an operating element of the vehicle and a driver of the vehicle, a distance between the operating element and a hand of the driver; an operating element classifying component for determining, based on a part of the image capturing the operating element, classification information of the operating element; an driver pose classifying component for determining, based on a part of the image capturing the driver, classification information of a pose of the driver and an operation determining component for determining, based on the distance, the classification information of the operating element and the classification information of the pose of the driver, whether the driver operates the operating element. The operating element classifying component, the driver pose classifying component and the operation determining component operate in response to the distance meeting a criterion being indicative of a possibility that the driver operates the operating element.

According to a fourth aspect, a driving assistance system for a vehicle is provided. The driving assistance system comprises the processing apparatus according to the second and/or third aspect. An autonomous driving system for a vehicle may also be provided with the processing apparatus according to the second and/or third aspect.

According to a fifth aspect, a vehicle is provided with an image capturing system for capturing an image including at least part of the operating element of the vehicle and at least part of a driver of the vehicle and a driving assistance system according to the fourth aspect. Alternatively, or additionally, the vehicle may comprise the image capturing system and the autonomous driving system.

According to a sixth aspect, a computer program product is provided. The computer program product comprises instructions which, when executed by a computer, cause the computer to carry out the method according to the first aspect and embodiments thereof.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings, and claims.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

A better understanding of the subject disclosure can be obtained when the following detailed description of various example embodiments is considered in conjunction with the accompanying drawings, in which.

In the drawings, reference numbers may be reused to identify similar and/or identical elements.

DETAILED DESCRIPTION

Figure 1:
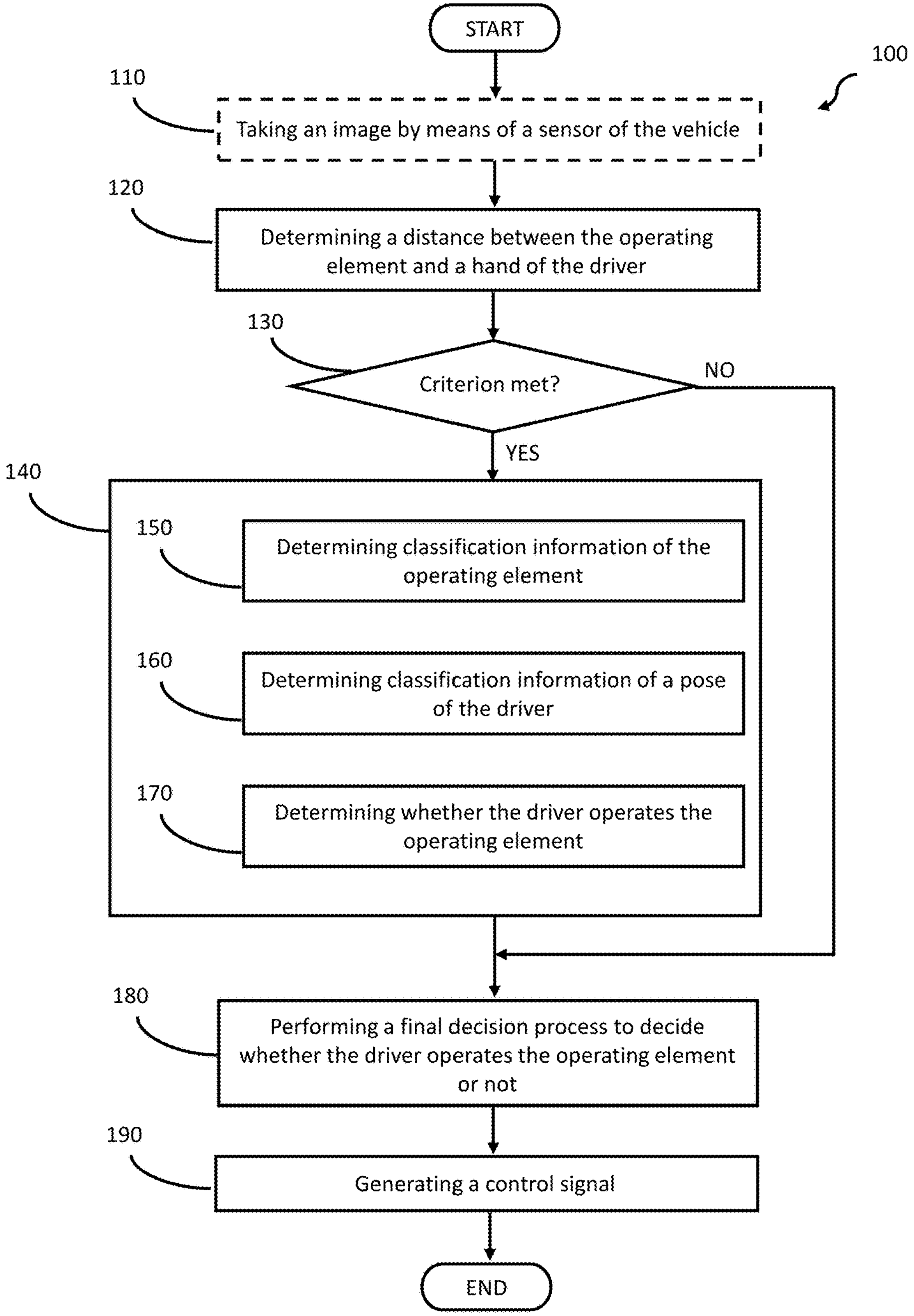
FIG. 1 illustrates an example method for driving assistance in a vehicle according to one embodiment of the subject disclosure.

Before explaining the example embodiments of the subject disclosure in more detail, certain general principles relating to the subject disclosure are briefly explained to assist in understanding the technology underlying the described examples.

The camera-based solutions are typically based on cameras with a rear view in the cabin of the vehicle and thus often lack a viewing angle or a mounting position that allows to monitor the whole region of the operating element. Typically, only a small part of the operating element is visible in images taken by the cameras of these camera-based solutions, causing difficulties in the detection of whether the driver is holding the operating element. For example, as only a small part of the operating element is visible in images taken by the cameras, the hands of the driver may not be visible at all or concealed.

The subject disclosure therefore aims to provide improvements for the existing camera-based solutions. For example, the subject disclosure provides a camera-based solution to detect if the driver has one or more hands on or at least near the operating element. The improved camera-based solution involves focusing on the hands of the driver and using an image crop of the operating element.

It is therefore a general principle of the subject disclosure to determine whether the driver of a vehicle has at least one hand on or near the steering wheel, in a rear-view interior camera image. For the determination, the distance of the driver's hands to the steering wheel is calculated and classification is performed with respect to the steering wheel, the driver's body pose and the driver's hand. The classification is based on a small crop of the camera image showing the steering wheel and the driver's hands.

Now, example methods for driving assistance in a vehicle according to some embodiments of the subject disclosure will be described.

The example methods may be implemented in a vehicle. The example methods may be performed by a processing device such as the computing system described below with reference to FIG. 8. The computing system may be integrated into or installed in the vehicle and coupled to one or more components of the vehicle, such as a sensing system. The sensing system may comprise an image capturing system including, but not limited to, a sensor such as a radar sensor, a light detection and ranging (Lidar) sensor, a camera, etc. Furthermore, the computing system may also be coupled to an information display device (e.g., a display, a head-up display (HUD), a navigation system or a fully digital instrument cluster, etc.), an input device (e.g., a driving wheel, speedometer, etc.), an (advanced) driving assistance system (ADAS) (e.g., a lane departure warning system, a lane change assistance system, an adaptive cruise control system, etc.), or the like, via respective interface(s). It is to be understood that the example method need not be performed by a processing device in the vehicle but may also be performed as a partially or fully distributed application using a (remote/cloud-based) computing system with which the vehicle is coupled and communicates via a network (e.g., a mobile communication system such as a 5G communication system operating according to 3GPP specifications). Although the example method is described in connection with or for use in a driving assistance system (or ADAS), the skilled person understands that it is not limited thereto. Rather, the example method may also be used in conjunction with an autonomous driving system (ADS).

For the purposes of this description, vehicles are typically vehicles for land transportation, such as passenger cars or trucks that participate in public road traffic and use roads. However, it is to be understood that the subject disclosure is not limited thereto and relates, for example, to other vehicles for transport on land, such as motorbikes, as well as vehicles for water and air transport. The latter may comprise, for example, the use of the example method in an aircraft, where the example method serves to control movement or driving of the aircraft on taxiways, runways, or the apron of airfields. Furthermore, for the purposes of this description, operating elements are elements used by drivers to operate such vehicles or functions thereof, such as a driving or steering wheel, a handle bar, a joystick, or the like.

The example methods of the subject disclosure are to determine, or decide, whether the driver of the vehicle operates an operating element of the vehicle. For example, the methods are to determine whether, with a certain confidence, the driver of a car operates a steering wheel of the case by having one or both hands on, or at least close to, the steering wheel. The result of the determination (e.g., in the form of a control signal) may be used as input to a driving assistance system (or ADAS) or autonomous driving system (ADS) of the vehicle and thereby used for driving assistance.

FIG. 1 illustrates an example method 100 for driving assistance in a vehicle according to one embodiment of the subject disclosure. The method may be performed by the processing device, as explained hereinbefore. The processing device may be an embedded system or a part thereof. In the embodiment described herein, the processing device is integrated into the vehicle.

The example method 100 begins by determining a distance between the operating element (e.g., a steering wheel) and a hand of the driver (activity 120). The determination is based on at least one image. The at least one image captures the operating element of the vehicle and the driver of the vehicle, both at least in part. For example, the at least one image is taken from inside the cabin of the vehicle and contains imaged objects that correspond to a part of the operating element or a part of the driver (e.g., a hand or at least a part of the hand of the driver). The at least one image may be captured or taken by using a sensor of the vehicle, such as a camera, mounted in the vehicle (activity 110).

Following the determination of the distance (activity 120), the example method 100 includes determining whether the distance determined meets a criterion indicative of a possibility that the driver operates the operating element (activity 130). An example of the criterion includes the distance exceeding, or being below, a given threshold. That is, if the distance between the hand of the driver (i.e., the left hand and/or the right hand of the driver) to the operating element (i.e., the steering wheel) is determined to be large (e.g., greater than a given distance, such as 10 cm) such that the possibility that the hand of the driver operates the operating element is low. Accordingly, the criterion may be indicative of whether the hand of the driver is located proximate to the operating element such that it is possible that the hand operates the operating element. The determination may also include to determine whether the hand of the driver (i.e., at least one hand of the driver) is located within a region of the image that also includes the operating element or at least a part thereof. The region may be determined or defined as will be described below. The determination that the hand is located with the region may be used as indication that the distance meets the criterion.

The determination in activity 130 may also include a determination of whether the distance is determined in activity 120 at all. For example, if the image does not capture the hand of the driver or captures at least a part of the hand only, the distance may not be determined in activity 120, at least not with a certain confidence. Additionally, in some examples, the determination in activity 130 may include determining a confidence value for the criterion indicating a confidence of whether the distance meets the criterion and thus a confidence for the possibility that the driver operates the operating element.

In response to determining in activity 130 that the distance does not meet the criterion which is indicative that there is no possibility, at least with the certain confidence, that the driver can operate the operating element, the example method 100 proceeds with activity 180, described below in more detail. For example, if the distance between the hand of the driver to the operating element is determined to be large, or if no hand of the driver is determined to be located within the region of the image including the operating element, the possibility that the hand of the driver operates or can operate the operating element is low. The condition is determined in activity 130 to be not met. In this case, the example method 100 proceeds with activity 180. Additionally, in some examples, the example method 100 proceeds with activity 180 in response to determining that the confidence value for the criterion exceeds, or is below, a certain threshold for the confidence value.

Otherwise, in response to determining in activity 130 that the distance meets the criterion and thus indicates that there is a possibility that the driver operates the operating element, the example method 100 proceeds with activity 140. For example, if the distance between the hand of the driver to the operating element is determined to be not large (e.g., not greater than the given distance) such that there is the possibility that the hand of the driver operates the operating element (i.e., the possibility is not low). Also, if it is determined that the hand of the driver is within the region including the operating element, there may be the possibility that the hand of the driver operates the operating element. In such cases, the example method 100 proceeds with activity 140 and performs additional determinations for improving the determination result and increasing confidence that the driver operates the operating element. Additionally, the example method 100 may proceed with activity 140 in response to determining in activity 130 that the distance cannot be determined in activity 120 at all or at least not with the certain confidence. Additionally, in some examples, the example method 100 proceeds with activity 140 in response to determining that the confidence value for the criterion does not exceed, or is not below, the certain threshold for the confidence value.

In activity 140, the example method 100 includes determining classification information of the operating element (activity 150). The determination in activity 150 is based on a part of the image that captures the operating element. The classification information of the operating element provides an indication of whether the driver can operate the operating element. For example, the classification information of the operating element indicates whether the hand of the driver may be located proximate (i.e., close to) the operating element such that the driver can operate the operating element.

Classification is known to one of ordinary skilled in the art as defining a process of recognition, understanding, and grouping of objects and ideas into pre-set categories. Using pre-categorized training datasets, the classification leverages a wide range of algorithms to classify datasets into respective and relevant categories. Classification algorithms used in machine learning utilize input training data for the purpose of predicting the likelihood or probability that the data that follows will fall into one of the predetermined categories. The classification according to embodiment of the subject disclosure concerns the form of pattern recognition. That is, the classification algorithms applied to the training data find the same pattern in future data sets. For example, the classification algorithms applied to training data (e.g., training or references images capturing parts of the operating element and/or parts of the driver) are used to find similar pattern (i.e., objects) captured in future images. That is, the operating element and/or the driver captured in the training or references images are used to find the operating element and/or the driver in the images.

In some examples, the part of the image on which the determination in activity 150 is based may capture only a part of the operating element. In such examples, the determination in activity 150 includes determining the classification information of the operating element with respect to parts of the operating element not captured in the image (i.e., parts of the operating element not visible in the part of the image or the image at all). That is, the classification information of the operating element may indicate whether, with a certain confidence, the driver may operate the operating element at a part thereof not captured in the part of the image. For example, the classification information of the operating element indicates whether the hand of the driver may be located proximate (i.e., close to) the operating element outside of the part of the image. The determination of the classification information with respect to parts of the operating element not captured in the image may be based on (virtually) expanding the image and using training or reference images capturing the operating element (i.e., not only a part thereof). The image may be expanded to a size that corresponds to a size of the training or reference images. Based on the part of the operating element captured in the image (i.e., visible in the image), the training or reference images may be used to determine parts of the operating element not captured in the image (i.e., not visible in the image) but included in the expanded image.

Furthermore, in activity 140, classification information of a pose of the driver is determined (activity 160). The pose of the driver comprises a pose of the driver sitting on a front seat of the vehicle and driving the vehicle. The pose may comprise poses of one or both hands of the driver, poses of one or both arms of the driver, poses of one or both legs of the driver, poses of the upper part of the body of the driver, or the like. The determination in activity 160 is based on a part of the image that captures the driver or at least part of the driver. The classification information of the pose of the driver provides an indication of whether the driver in the pose can operate the operating element. For example, the classification information of the pose of the driver indicates whether the pose of the arm of the driver, the pose of the leg of the driver and/or the pose of the upper part of the body of the driver corresponds to a pose in which the driver can operate the driving element. If, for example, the classification information of the pose of the driver indicates that the upper part of the body of the driver is turned away from the operating element (e.g., the driver is looking in the direction of the backseats of the vehicle), the driver may possibly not be able to operate the operating element. In another example, if the classification information of the pose of the driver indicates that the arm of the driver is directed towards the gearshift lever of the vehicle, there is a possibility that the driver is not able to operate the operating element, at least with the hand of the arm. In another example, the classification information of the pose of the driver indicates whether the pose of the hand of the driver correspond to a pose in which the hand can operate the driving wheel. If, for example, the classification information of the pose of the driver indicates that the hand of the driver is clenched to a fist, the driver may possibly not be able to operate the operating element. Otherwise, if the classification information of the pose of the driver indicates a typical gripping pose, there is a possibility that the hand of the driver holds the operating element and thus that the driver operates the operating element.

In some examples, the part of the image may capture only a part of the driver. In such examples, the determination in activity 160 includes determining the classification information of the pose of the driver with respect to parts of the driver not captured in the image (i.e., parts of the driver not visible in the part of the image or the image at all). That is, the classification information of the pose of the driver may indicate whether, with a certain confidence, that the driver may operate the operating element with a part not captured in the part of the image. For example, the classification information of the pose of the driver indicates whether the pose of an arm of the driver allows the hand of the arm, which is outside the part of the image, to be located proximate (i.e., close to) the operating element. The determination of the classification information with respect to parts of the driver not captured in the image may be based on (virtually) expanding the image and using training or reference images capturing the driver (i.e., not only a part thereof). The image may be expanded to a size that corresponds to a size of the training or reference images. Based on the part of the driver captured in the image (i.e., visible in the image), the training or reference images may be used to determine parts of the driver not captured in the image (i.e., not visible in the image) but included in the expanded image.

As will be discussed in more detail below, the determination of the classification information of the pose of the driver in activity 160 comprises determining poses of each of a plurality of parts of the driver (e.g., a pose of the body of the driver, a pose of the left hand, a pose of the right hand). Accordingly, the determination may comprise determining classification information indicating whether the body pose of the driver allows the driver to operate the operating element and/or determining classification information indicating whether the hand pose of the driver allows the driver to operate the operating element.

In response to the determinations described above, the activity 140 further comprises determining whether the driver operates the operating element, at least with a certain confidence (activity 170). The determination in activity 170 is based on one or more of the distance (i.e., the result of activity 120), the classification information of the operating element (i.e., the result of activity 150) and the classification information of the pose of the driver (i.e., the result of activity 160). In other words, the results of the determinations in activities 120, 150, 160 are combined and fused to determine that the driver operates or does not operate the operating element, with a certain confidence.

In activity 180, a final decision process may be performed to decide whether the driver operates the operating element or not. For example, in response to determining in activity 130 that the distance does not meet the criterion, the final decision process results in the indication that the driver does not operate the operating element. On the other hand, based on the result of the activity 170, the final decision process results in the indication that the driver operates or does not operate the operating element.

Finally, in some examples, the example method 100 comprises generating a control signal for driving assistance indicating whether the driver operates the operating element (activity 190). The generation of the control signal in activity 190 may be based on the result of the final decision process in activity 180. The control signal may be input to a driving assistance system (or ADAS) or autonomous driving system (ADS) of the vehicle and used for controlling the operation of the vehicle (e.g., performing an emergency operation if the driver does not operate the operating element for a certain period).

The example method 100 according to some embodiments of the subject disclosure enables a determination of whether the driver operates the operating element of the vehicle and thus operates the vehicle. The determination may be used for driving assistance of the vehicle.

In some examples, the method 100 according to FIG. 1 may further comprise defining a region in the image including at least a part of the operating element. For example, since the positions of the sensor which takes the image and the operating element in the vehicle and thus their positional relation are fixed (i.e., known), the region in the image which includes the operating element or at least part thereof is also fixed (i.e., known) and can be defined in the image. Alternatively, or additionally, the method 100 may comprise detecting, using a detection network trained to locate at least one part of the operating element, the region including at least the part of the operating element. For example, the detection network may be trained using reference images in which positions of parts of the operating element are indicated. Using techniques of machine learning or neural networks, the detection network may be used to detect the part(s) of the operating element captured in the image. That is, the techniques of machine learning or neural networks are used to detect objects in the image that are similar to parts of the operating element from the reference images. Based on the detected objects, the region of these objects and thus the region including the part(s) of the operating element can be derived. In response to defining/detecting the region, the location of the operating element may be determined based on the region. In the determination of the location, the (fixed/known) position of the operating element in the vehicle and the reference images may be used. The detection of the region may also include determinations of parts of the operating element not captured in the image, as described above.

In some examples, the method 100 according to FIG. 1 may further comprise determining one or more body keypoints indicating at least one hand of the driver. The determination of these body keypoints is based on a plurality of body keypoints of the driver. For example, a detection network trained to locate body keypoints of the driver may be used. As described above, the detection network may be trained using reference images in which parts of the driver and body keypoints are indicated. Using techniques of machine learning or neural networks, the detection network may be used to detect the body keypoints of the driver in the image by detecting objects in the image which are similar to parts of the driver from the reference images. The plurality of body keypoints are then determined based on the detected objects. Based on the determined body keypoints indicating the hand of the driver, the location of the hand of the driver in the vehicle is determined (e.g., using the body keypoints in the reference images). In activity 120, the determined location of the hand of the driver may be used to determine the distance between the operating element and the hand of the driver.

The determination of the body keypoints indicating the hand of the driver may, for example, be performed for the left hand and/or the right hand of the driver separately. The determined body keypoints may be used to determine separate distances between the left/right hand and the operating element in activity 120. In this case, the determination of whether the distance meets the criterion (i.e., activity 130) is performed for each of the distances separately. The method 100 may proceed to activity 180 in case both distances are determined in activity 130 to not meet the criterion which indicates that the driver does not operate the operating element. If, otherwise, at least one of the distances meets the criterion (i.e., at least one hand of the driver operates operating element), the method 100 proceeds with activity 140.

In the examples described above, the location of the operation element and the location of the at least one hand are determined with respect to a reference coordinate system for the vehicle. The reference coordinate system may be defined for the vehicle. Based on the reference coordinate system, positions/locations in the vehicle are derived. The determination of the distance in activity 120 may comprise calculating a Euclidian distance between the operating element (i.e., the determined location of the operating element in the vehicle) and the hand of the driver (i.e., the determined location of the hand in the vehicle) with respect to the reference coordinate system e.g. using algorithms of triangulation.

In some examples, the determination of the classification information of the operating element in activity 150 may comprise classifying the part of the image on which the determination is based to detect whether the hand of the driver is located proximate to the operating element. The proximity to the operating element provides an indication as to whether the driver can operate the operating element. The classification uses a classification network for detecting operating of the operating element. The classification network for detecting operating of the operating element may be trained to detect whether the hand of the driver captured in the image may be located proximate to the operating element. For example, the detection network may be trained using reference images that capture the hand of the driver and the operating element and information indicating whether the captured hand is proximate to operate the operating element. Using techniques of machine learning or neural networks, the detection network may be used to detect whether the hand of the driver is located proximate to the operating element to allow the hand holding the operating element and allowing the driver to operate the operating element. For example, the part of the image may be classified to detect objects that are similar to the hand of the driver in the reference images and determined, based on the information from the classification network whether the hand is located proximate to the operating element, allowing the hand to hold the operating element. Based on the classification, the classification information of the operating element indicating whether the driver operates the operating element may be determined.

In some examples, the determination of the classification information of the pose of the driver in activity 160 may comprise classifying the driver captured in the image to detect the body pose of the driver. The classification uses a classification network for detecting the body pose of the driver. The classification network for detecting the body pose of the driver is trained to detect, based on a plurality of body keypoints of the driver, body poses of the driver captured in the image. For example, the detection network may be trained using reference images including body poses of the driver. The body poses in the reference images are defined using the plurality of body keypoints relating to the body of the driver and information relating to whether the driver in the respective body pose can operate the operating element. Using techniques of machine learning or neural networks, the detection network may be used to detect the body pose of the driver in the image. Based on the classification of the driver, the classification information indicating whether the body pose of the driver is to allow the driver operating the operating element is determined.

In some examples, the determination of the classification information of the pose of the driver in activity 160 may comprise classifying the driver captured in the image to detect the hand pose of the driver. The classification uses a classification network for detecting the hand pose of the driver. The classification network for detecting the hand pose of the driver is trained to detect, based on a plurality of body keypoints related to a hand of the driver, hand poses of the driver captured in the image. For example, the detection network may be trained using reference images including reference hand poses of the driver. The hand poses in the reference images are defined using the plurality of body keypoints relating to the hand of the driver and information relating to whether the hand of the driver in the respective hand pose can operate the operating element. Using techniques of machine learning or neural networks, the detection network may be used to detect the hand pose of the driver in the image. Based on the classification of the driver, the classification information indicating whether the hand pose of the driver is to allow the driver operating the operating element is determined.

In some examples, the determination of the classification information of the pose of the driver in activity 160 may comprise classifying the hand of the driver captured in the image to detect whether the hand is holding an object such as the operating element, a mobile phone, a cigarette, etc. The classification uses a classification network for detecting if there is an object in the hand of the driver. The classification network for detecting if there is an object in the hand of the driver is trained to detect objects held in the hand of the driver. For example, the detection network may be trained using reference images including reference objects held in the hand of the driver. Using techniques of machine learning or neural networks, the detection network may be used to detect if there is an object in the hand of the driver (i.e., whether the hand of the driver is holding the object or not). Based on the classification, the classification information indicating whether the hand is holding an object is determined.

In some examples, the example method 100 may further comprise cropping the image to generate the part of the image capturing the operating element or at least a part thereof and/or to generate the part of the image capturing the driver or at least a part thereof. Using the cropping, unwanted areas of the image are removed in order to accentuate or isolate subject matter of interest (e.g., the part of the operating element or the part of the driver) from its background. The cropping related to the operating element is based on the location of the operating element, which may be defined/determined as described above. On the other hand, the cropping related to the driver is based on the plurality of body keypoints of the driver, determined as described above. Additionally, or alternatively, the cropping related to the driver may use a classification network for detecting at least a part of the driver in the image. The classification network used for cropping may be trained to detect the driver or parts thereof in the image. For example, the classification network may be trained using reference images that capture the driver or parts thereof and information indicating regions in the reference images where the driver or parts thereof are captured. Using techniques of machine learning or neural networks, the classification network may be used to detect the driver or parts thereof in the image. Based on the result of the classification, the part of the image capturing at least the part of the driver may be generated.

In some examples, the example method 100 may further comprise determining the plurality of body keypoints of the driver. The determination is based on the image capturing the driver and may use techniques of machine learning or neural networks, as described above.

In some examples, the activity 170 for determining whether the driver operates the operating element may further comprise weighting the distance, the classification information of the operating element and the classification information of the pose of the driver. For example, predefined weights may be used and applied to the distance, the classification information of the operating element and the classification information of the pose of the driver.

Figure 2:
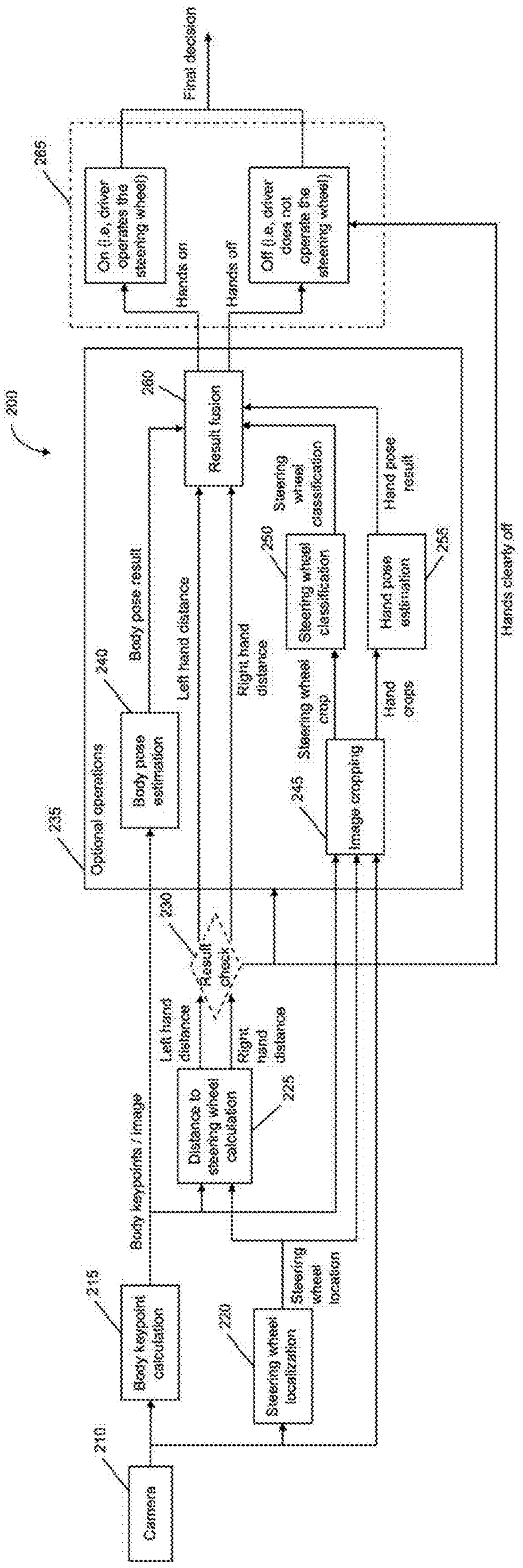
FIG. 2 illustrates an example method for driving assistance in a vehicle according to one embodiment of the subject disclosure.

FIG. 2 illustrates an example method 200 for driving assistance in a vehicle according to one embodiment of the subject disclosure. The method may be performed by the processing device, as explained hereinbefore. The example method 200 represents an example of the example method 100 shown in FIG. 1.

According to the example method 200, an image is captured or taken by using a sensor of the vehicle, such as a camera, mounted in the in block 210. The operation for taking the image corresponds to activity 110 shown in FIG. 1. The sensor is mounted at a fixed position within the vehicle such as near an inside rearview mirror of the vehicle and directed towards the rear of the vehicle. Typically, the sensor takes images from the inside of the vehicle continuously or at a given time interval. The image taken in block 210 corresponds to one of these images and may be selected from among the images. The image taken by the sensor captures an area of the vehicle including the driver (i.e., the driver sitting at the driver's front seat of the vehicle) and an operating element (e.g., a steering wheel) of the vehicle. The driver and/or the operating element may be captured in part only. That is, the images taken by the sensor captures a part of the driver and a part of the operating element. Examples of the image include an RGB, IR or depth image.

The method 200 further includes performing a calculation of body keypoints using the image (block 215). In block 215, as described above, the image including the driver may be classified using a classification network for detecting at least parts of the driver in the image. The classification network is trained to detect parts of the driver. Based on the classification, a plurality of body keypoints corresponding to the detected parts of driver are determined. For example, the classification network may be trained using reference images capturing the area of the vehicle including parts of the driver and information about body keypoints associated with the parts of the driver captured in the reference images (e.g., locations of the body keypoints). As will be discussed hereinbelow, the calculation of the body keypoints is not limited to parts of the driver captured in the image (i.e., visible in the image) but may also include to determine body keypoints corresponding to parts of the driver not captured in the image (i.e., not visible in the image).

The image taken by the sensor in block 210 is further used in performing a location of the operating element in block 220 (e.g., also referred to as steering wheel localization). As described above, a region in the image may be defined or detected. The region includes at least a part of the operating element. Since the positions of the sensor which takes the image and the operating element in the vehicle are fixed (i.e., known), the region which includes the operating element or at least part thereof can be defined in the image. Alternatively, or additionally, the region may be detected, using a detection network trained to locate a part of the operating element. For example, the detection network may be trained using reference images in which parts of the operating element are indicated. Using the detection network, the image may be classified to detect the part of operating element and determine the location of the part of the operating element.

For example, in block 220, the steering wheel location in the image taken by the sensor can be determined by defining a region, which covers the operating element (e.g., the steering wheel), with respect to a reference coordinate system (e.g., a camera coordinate system). The region may be a rectangle, an ellipse or every other shape or a 3D model that covers the operating element in the reference coordinate system. Alternatively, the operating element may be located automatically to be invariant to changes of the sensor or operating element position. Here, a detection network may be trained to locate parts of the operating element captured in the image (i.e., visible). A model of the operating element may then be fit in the reference coordinate system to describe the location of the operating element even outside the image.

Figure 3A:
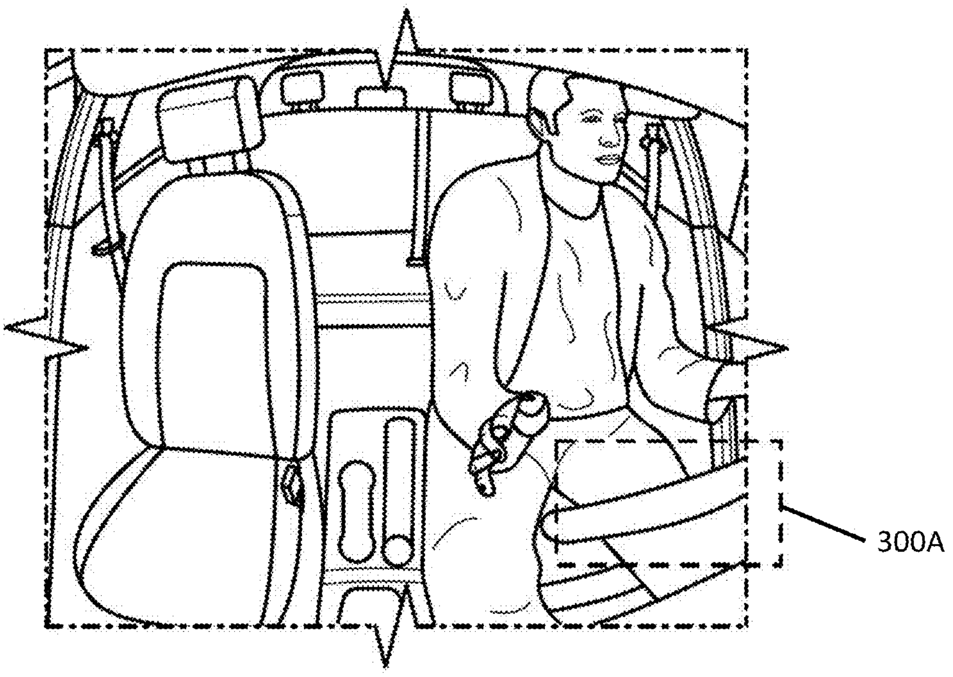
FIGS. 3A-3F illustrate examples of regions in the image including the operating element detected or defined according to embodiments of the subject disclosure.
Figure 3B:
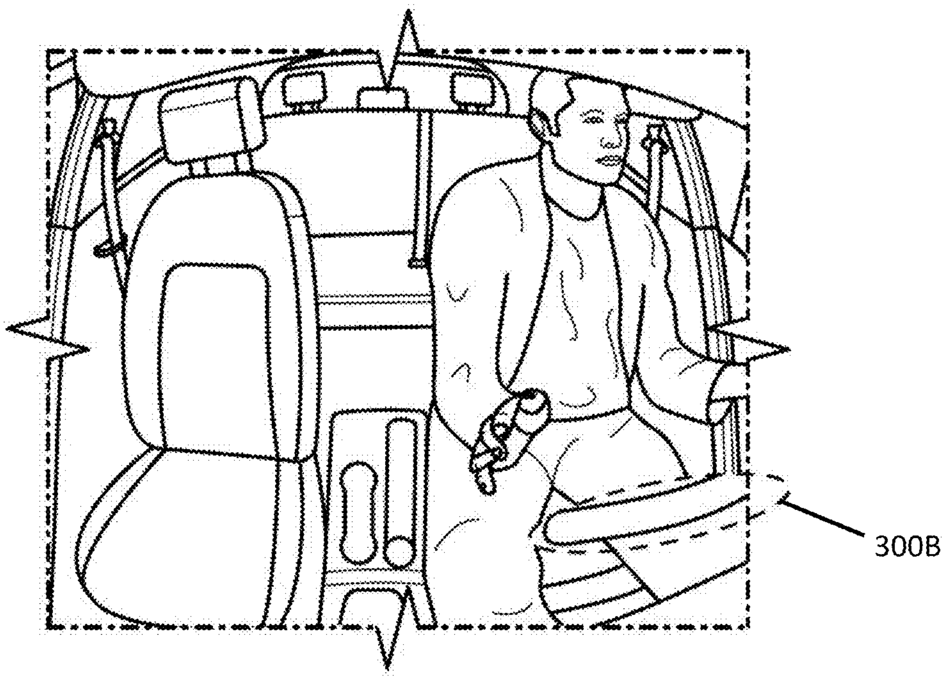
Figure 3C:
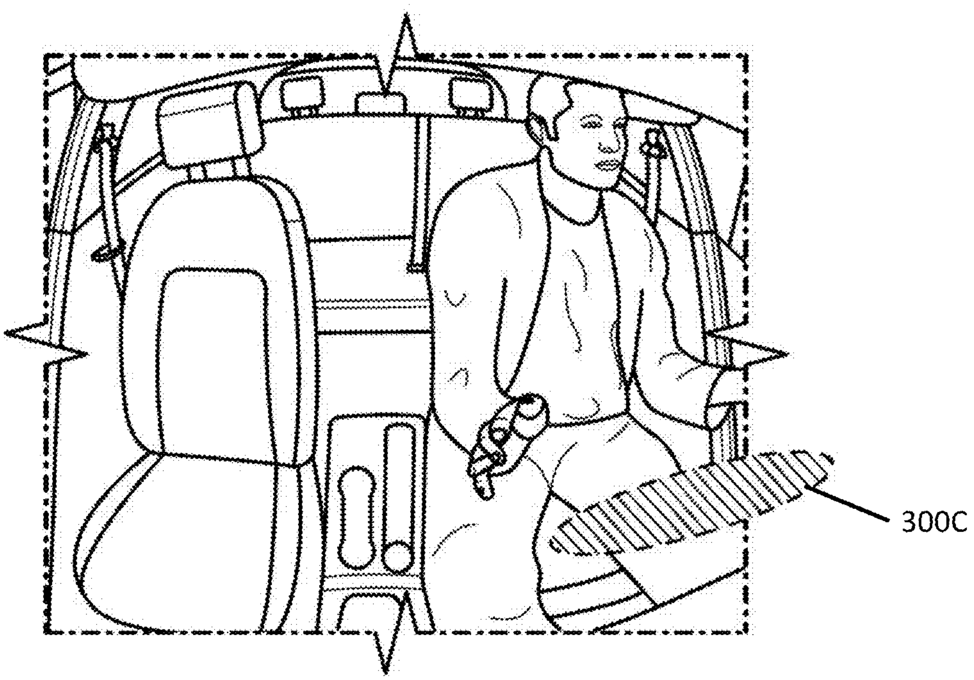
Figure 3D:
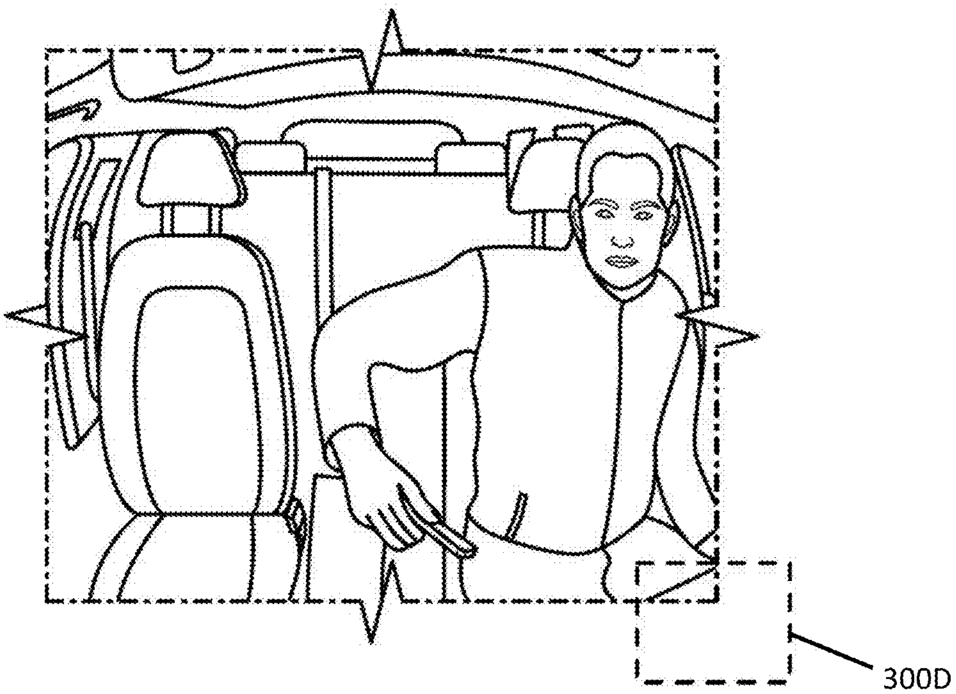
Figure 3E:
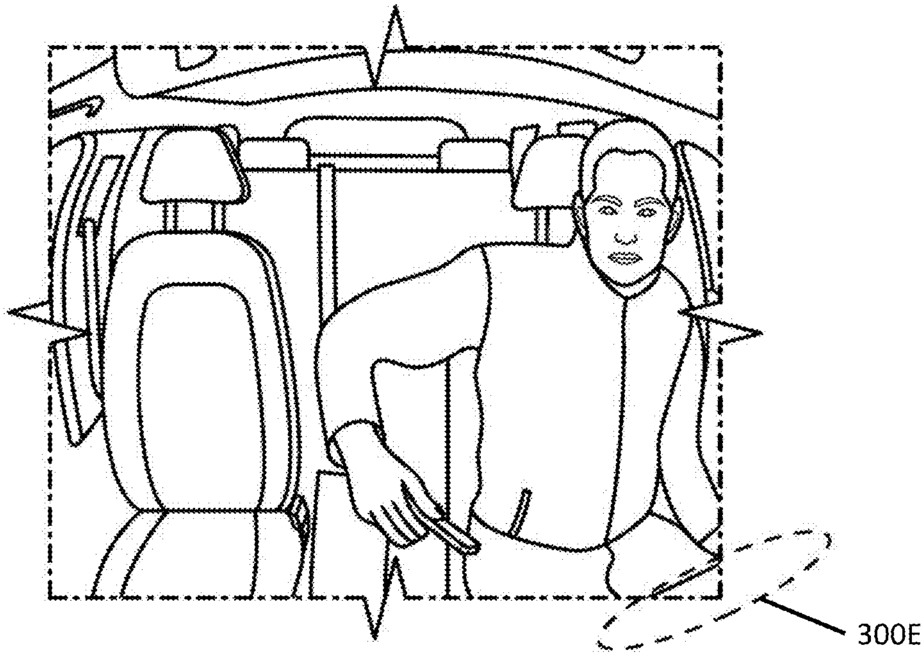
Figure 3F:
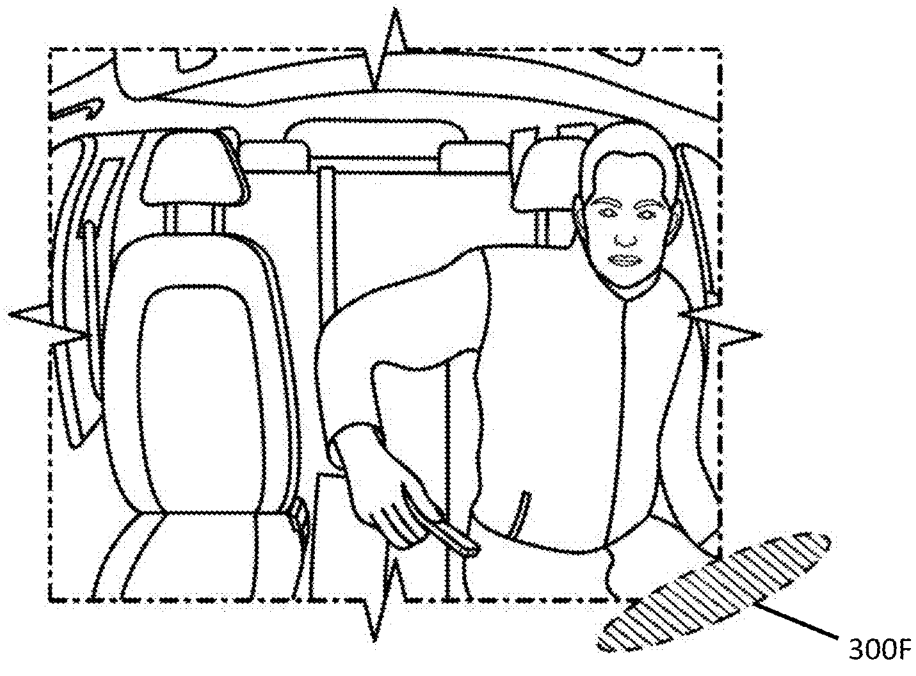

Examples for a detected/defined region 300A-300F in the image including the operating element are illustrated in FIGS. 3A to 3F. As illustrated, the images in FIGS. 3A to 3F capture a part of the operating element only and the determination of the region in block 220 is not limited to parts of the operating element captured in the image (i.e., visible in the image) but also includes parts of the operating element not captured in the image (i.e., not visible in the image). In FIGS. 3A and 3D, the region 300A, 300D has a rectangular shape. The region 300B, 300C, 300E, 300F in FIGS. 3B, 3C, 3E and 3F has an elliptical shape. More specifically, the shape of the region 300C, 300F in FIGS. 3C and 3F is an elliptical area while the shape of the region 300D, 300E in FIGS. 3D and 3E is an ellipse.

Referring again to FIG. 2, the example method 200 includes determining a distance between the operating element (e.g., the steering wheel) and the driver such as a hand of the driver in block 225 (referred to as distance to steering wheel calculation). The operation in block 225 corresponds to activity 120 of FIG. 1. The determination in block 225 is at least based on the image. The determination may also use the location of the operating element determined in block 220 and the body keypoints of the driver determined in block 215. For example, based on the body keypoints indicating a location of the hand of the driver and the location of the operating element, a distance between both locations may be determined.

The determination may be performed for the right hand and/or the left hand of the driver. In the determination, a Euclidian distance may be calculated using the locations with respect to the reference coordinate system.

That is, the operation in block 225 is a proximity-based operation using the determined body keypoints of the driver (block 220) to calculate the distance of the driver's hand(s) to the defined/determined location of the operating element. The calculation of the distance is not limited to locations of parts of the driver captured in the image (i.e., visible in the image) but may also include locations of parts of the driver not captured in the image (i.e., not visible in the image). That is, the determination of the body keypoints is extended in such a way that body keypoints relating to parts of the driver which are outside the image taken by the sensor and therefore not visible in the image can also be localized. The distance of the hand of the driver to the location of the operating element is calculated by calculating a pixel distance (e.g., the Euclidean distance) from body keypoints relating to the hand of the driver to the border of the (defined or determined) region of the operating element. The distance may be calculated as being zero if the body keypoints relating to the hand are within the region. The calculation may be performed for each hand of the driver separately. The body keypoints include one or more body keypoints. For example, in contrast to using a single body keypoint for each hand of the driver, a plurality of body keypoints on each hand (e.g., different finger joints, the ankle, the center of the back and/or the inner side of the hand) may be used to increase the precision of determining the location of the hand. Likewise, a diameter of the hand may be estimated, and the location of the diameter may then either be represented as a geometric shape (e.g., a rectangle/circle/ellipse around the body keypoint relating to the hand), facilitating the calculation of the distance. Otherwise, a pixelwise segmentation may be used to detect overlaps with the region including the operating element. Also, 3D body keypoints and a 3D location of the operating element may be used to determine the distance in a 3D space, resulting in an enhanced distance estimation, as hands hovering over the operating element can be detected more easily in the 3D space.

Figure 4:
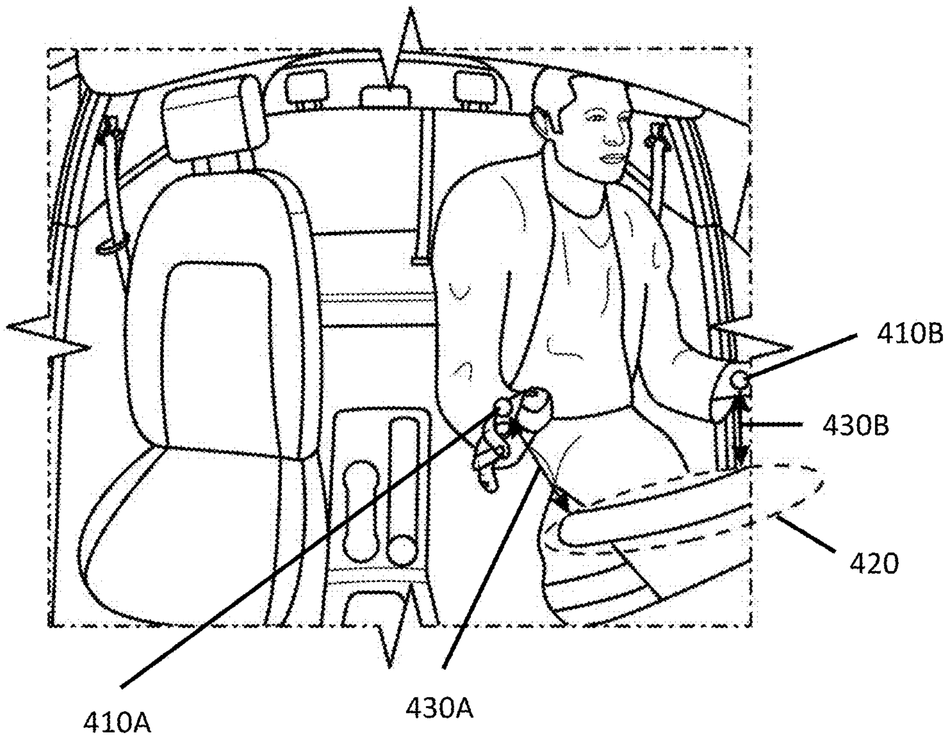
FIG. 4 illustrates an example of a distance between the hands of the driver and the operating element determined according to embodiments of the subject disclosure.
Figure 5A:
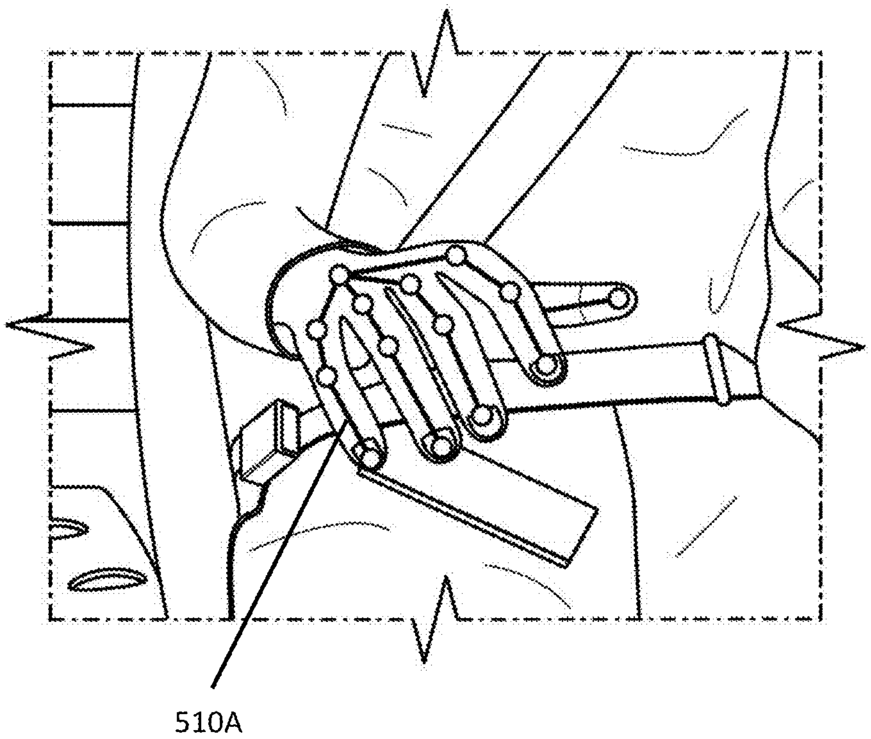
FIGS. 5A and 5B illustrate examples for body keypoints relating to the hand of the driver determined according to embodiments of the subject disclosure.
Figure 5B:
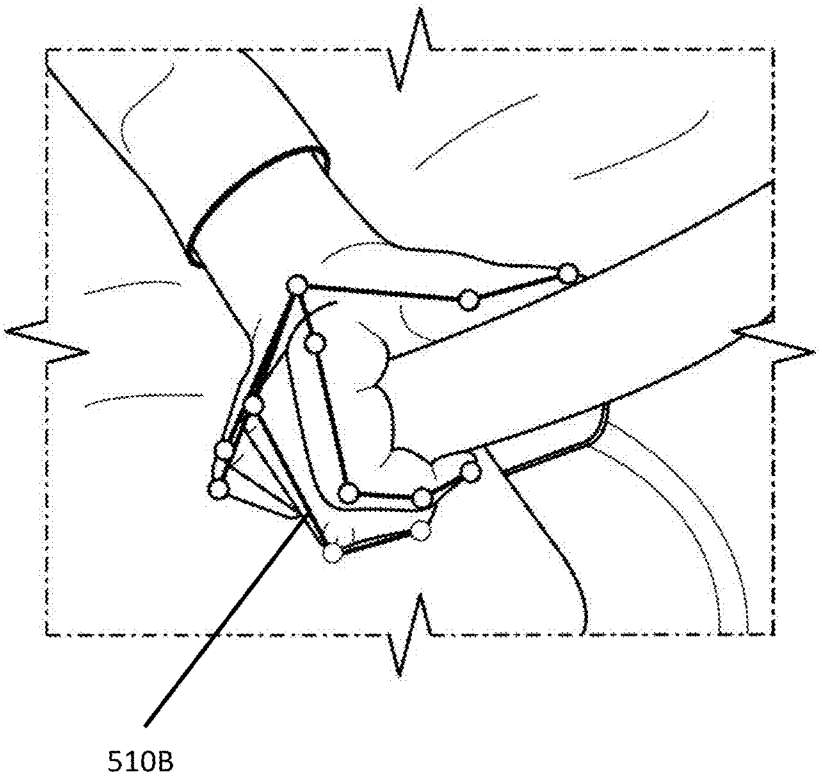

Referring to FIG. 4, the determination of the distance 430A, 430B between the hands of the driver and the operating element according to block 225 is illustrated. The determination is based on a single body keypoint 410A, 410B relating to each hand of the driver and the region 420 of the operating element determined/defined in block 220. FIGS. 5A and 5B illustrate examples for multiple body keypoints 510A, 510B relating to the hand of the driver.

Referring again to FIG. 2, a determination is made as to whether the distance (e.g., the distance between the left hand and the operating element and the distance between the right hand and the operating element) meets a criterion indicative of a possibility that the driver operates the operating element (block 230). The operation in block 130 corresponds to activity 130 of FIG. 1. For example, if the hand of the driver is located outside the region including the operating element and thus the distance is determined to be not zero, the criterion may be determined to be not met (i.e., hands of the driver are determined to be clearly of the operating element). Otherwise, if the hand of the driver is located within the region including the operating element and thus the distance is determined to be zero, the criterion may be determined to be met (i.e., the hands of the driver may hold the operating element such that there is a possibility that the driver operates the operating element) and the example method 200 may proceed with the operations in block 235. The operations in block 235 correspond to the determinations in activity 140 of FIG. 1.

In block 235, an operation to determine a body pose of the driver may be performed (block 240). The operation in block 240 (also referred to as body pose estimate) is comprised by activity 160 of FIG. 1 and comprises classifying, using a classification network for detecting a body pose of the driver, the driver to detect the body pose of the driver and determining, based on the classifying, classification information indicating whether the body pose of the driver is to allow the driver operating the operating element (i.e., body pose result). The operation for determining the classification information relating to the body pose of the driver is described above with reference to FIG. 1 and may be based on the body keypoints (e.g., image coordinates of the driver's body keypoints).

Figure 6A:
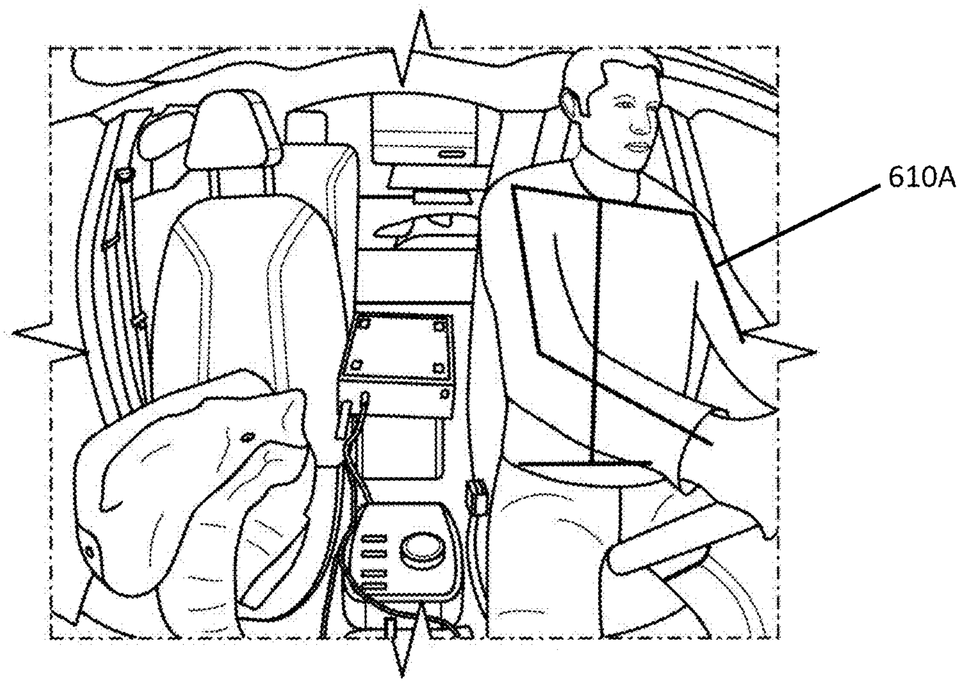
FIGS. 6A and 6B illustrate examples for body keypoints relating to the body of the driver determined according to embodiments of the subject disclosure.
Figure 6B:
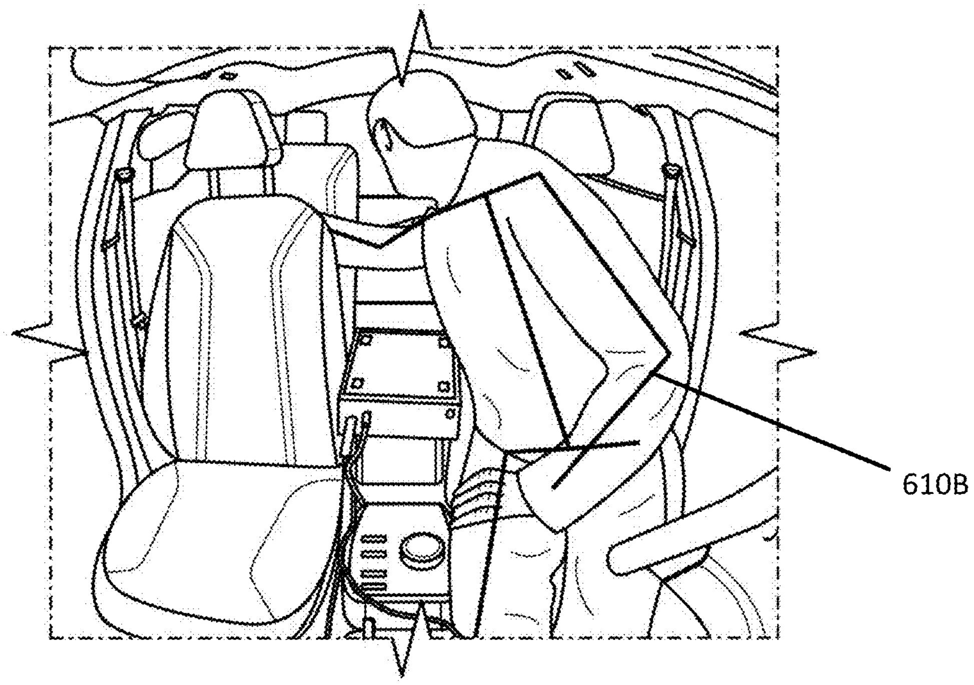

The body pose of the driver may provide additional indication of whether the driver may have a hand on the operating element or not. For example, if the driver sits in a normal driving position, the likelihood of having a hand on the operating element is higher than if the driver is turning to the backseat. These two examples are shown in FIG. 6A illustrating a spatial arrangement of the body keypoints indicating the normal driving position 610A and FIG. 6B illustrating a spatial arrangement of the body keypoints indicating the turning to the backseat position 610B.

Referring again to FIG. 2, the image may be cropped in block 245 to generate a part of the image capturing the operating element or at least a part thereof (referred to as steering wheel crop) and/or to generate a part of the image capturing the driver or at least a part thereof (referred to as hand crops) as described above with reference to FIG. 1. The cropping related to the operating element is based on the location of the operating element and the cropping related to the driver is based on the plurality of body keypoints of the driver.

In block 250, the part of the image capturing the operating element or at least the part thereof (i.e., the steering wheel crop) may be used to determine classification information relating to the operating element (i.e., steering wheel classification) as described above with reference to activity 150 of FIG. 1.

For example, the image crop containing the steering wheel may be classified by an artificial neural network (e.g., a classification network for detecting operating of the operating element) to detect if one or more hands are located on the operating element. If, for example, the arms of the driver are visible in the image crop, the network may use this information to detect if a hand might be close to the operating element outside the image. This classification may be done by classical statistical methods or machine learning approaches. Artificial neural networks (e.g., convolutional neural networks, CNN) have been proven successful in image classification tasks.

In block 255, the part of the image capturing the driver or at least a part thereof (i.e., the hand crops) may be used to determine classification information relating to a hand pose of the driver. The operation in block 255 (also referred to as hand pose estimation) is comprised by activity 160 of FIG. 1 and comprises classifying, using a classification network for detecting a hand pose of the driver, the driver captured in the image to detect the hand pose of the driver and determining, based on the classifying, the classification information indicating whether the hand pose of the driver is to allow operating the operating element (i.e., hand pose result). The operation for determining the classification information relating to the hand pose of the driver is described above with reference to FIG. 1 and may be based on the body keypoints relating to the hands.

For example, to classify the driver's hands, the image crop generated based on the body keypoints or a separate hand detection network may be used. By using a convolutional neural network for classification, a classification can be made as to whether the hand pose of the hand allows to hold the operating element. The body keypoints detected on the hands may be classified similarly to the described body pose network to decide if the hand pose allows to hold the operating element or not. FIGS. 5A and 5B illustrate body keypoints 510A, 510B relating to the hand of the driver and provide indication of a hand pose.

Additionally, or alternatively, the part of the image capturing the driver or at least a part thereof (i.e., the hand crops) may be used in block 255 to determine classification information relating to whether the hand of the driver is holding an object. The operation in block 255 comprises classifying, using a classification network for detecting whether the hand is holding an object, the driver captured in the image to detect whether if there is an object in the hand of the driver and determining, based on the classifying, the classification information indicating whether the hand of the driver is holding an object. The operation for determining the classification information relating to whether the hand of the driver is holding an object is described above with reference to FIG. 1 and may be based on the detection of the object proximate to, or held by, the hand of the driver.

Figure 5C:
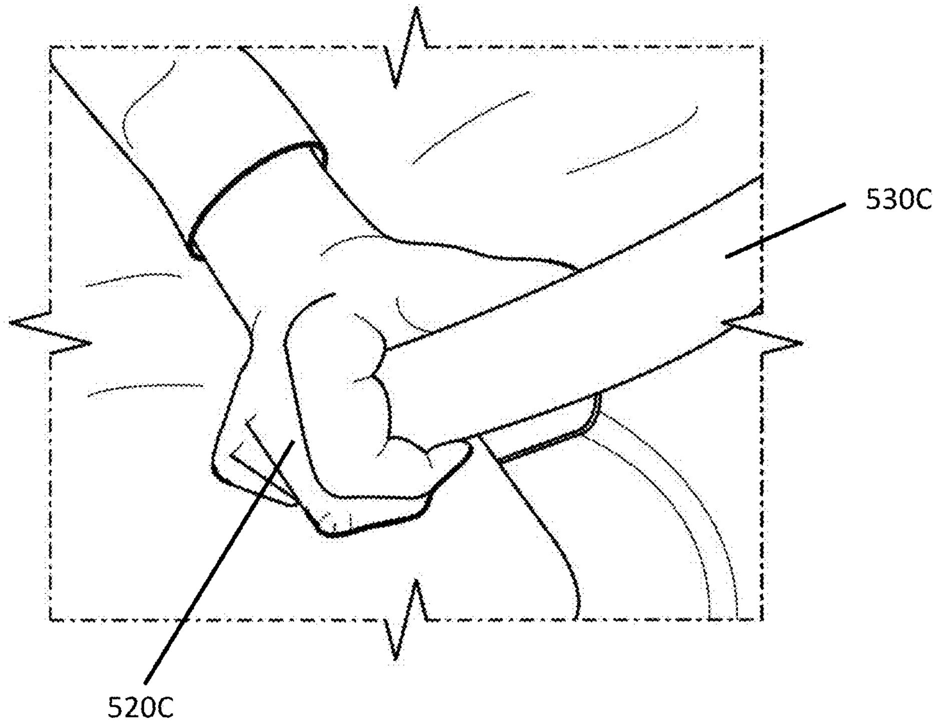
FIGS. 5C and 5D illustrate examples for hand poses of the driver determined according to embodiments of the subject disclosure.
Figure 5D:
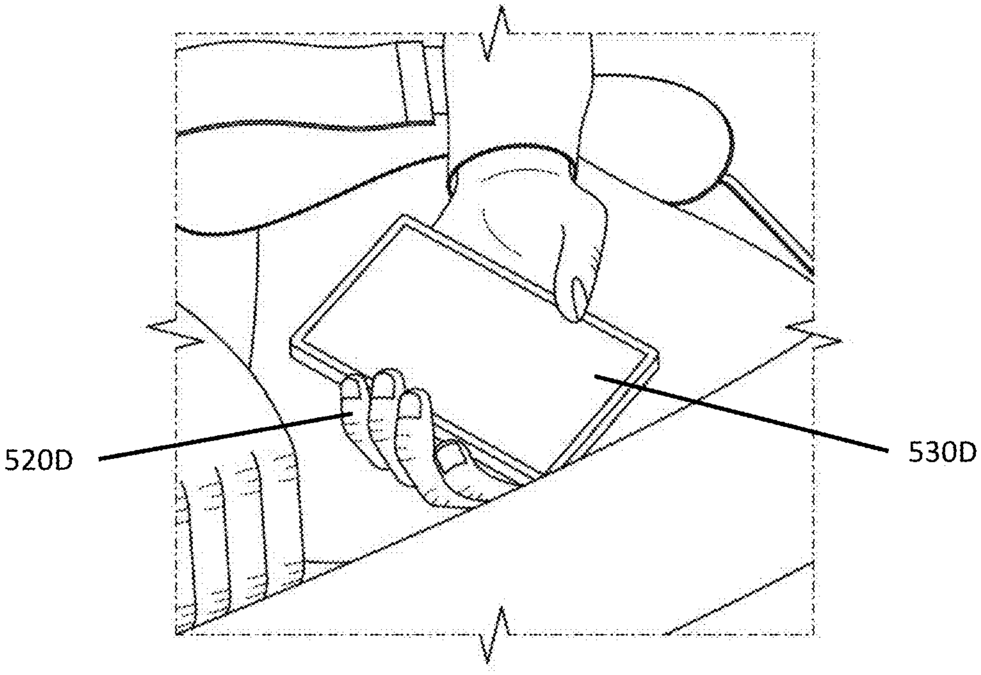

For example, to classify the driver's hands, the image crop generated based on the body keypoints or a separate hand detection network may be used. By using a convolutional neural network for classification, a classification can be made as to whether the hand is holding the operating element and/or detect if there is an object in the hand or if the hand is empty. If there is an object such as a mobile phone or a cigarette in the hand, that hand is most probably not holding the operating element. The body keypoints detected on the hands may be classified similarly to the described body pose network to decide if the hand is holding an object or not. FIGS. 5C and 5D illustrate hand poses 520C, 520D relating to the hand of the driver holding the operating element 530C or a mobile phone 530D and provide indication of whether the hand of the driver is holding an object or not.

In block 260, a determination is made as to whether the driver operates the operating element (referred to as result fusion). The determination in block 260 corresponds to activity 170 described above with reference to FIG. 1. The determination is based on the body pose result, the distance (s) to the operating element, the steering wheel classification and the hand pose result. The results may be combined, weighted and fused to determine whether the hand of the driver operates the operating element (hands on) or not (hands off).

For example, the results may be fused in block 260 based on different dependencies. Each result may be weighted differently depending on different conditions. A predefined weight may be applied to each result. Alternatively, the weighting may be learned with a machine learning approach like a neural network, a SVM or other machine learning approaches. If, for example, the weighting is manually defined the weights may be adapted based on the number of valid incoming results. The weights should sum up to one while weights for invalid incoming results may be set to zero.

Finally, in block 265, a final decision process may be performed to decide whether the driver operates the operating element or not. The operation in block 265 corresponds to activity 180 as described above with reference to FIG. 1. Based on the result of the final decision process, a control signal indicating whether the driver operates the operating element or not may be generated. The control signal may be input to a driving assistance system (or ADAS) or autonomous driving system (ADS) of the vehicle and used for controlling the operation of the vehicle (e.g., performing an emergency operation if the driver does not operate the operating element for a certain period).

Figure 7A:
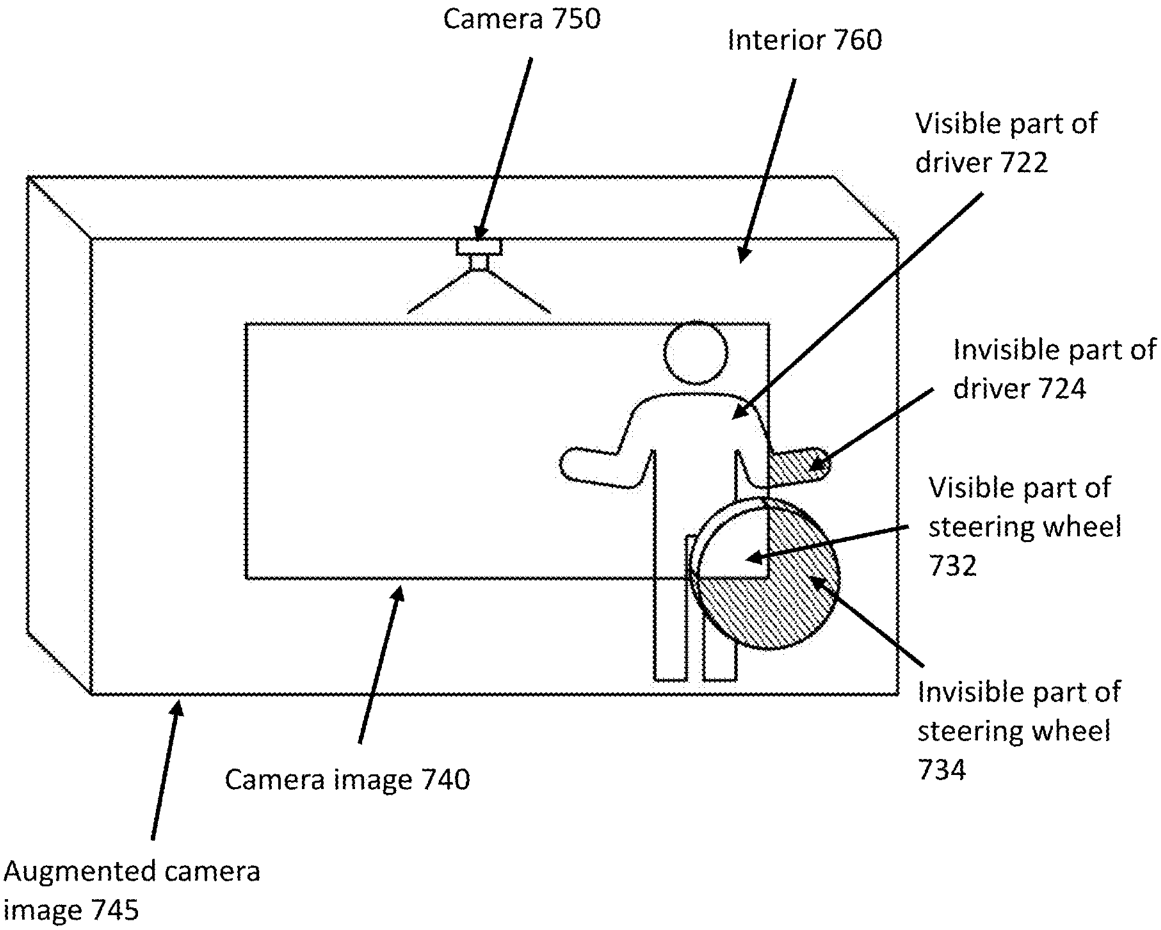
FIGS. 7A to 7C illustrate example images relating to a method for determining objects outside the image according to embodiments of the subject disclosure.

Now referring to FIGS. 7A to 7C, a method according to embodiments of the subject disclosure for expanding the image captured by the sensor to include therein objects (e.g., steering wheel, driver, or parts thereof) that are outside the image, will be described. The method according to FIG. 7A to 7C may be part of the activities 120, 150, 160 of FIG. 1 and blocks 215, 220, 225, 240, 245, 250, 255 of FIG. 2.

The described method uses a classification network or machine learning and neural network techniques. The classification network is trained using reference images as training data.

Figure 7B:
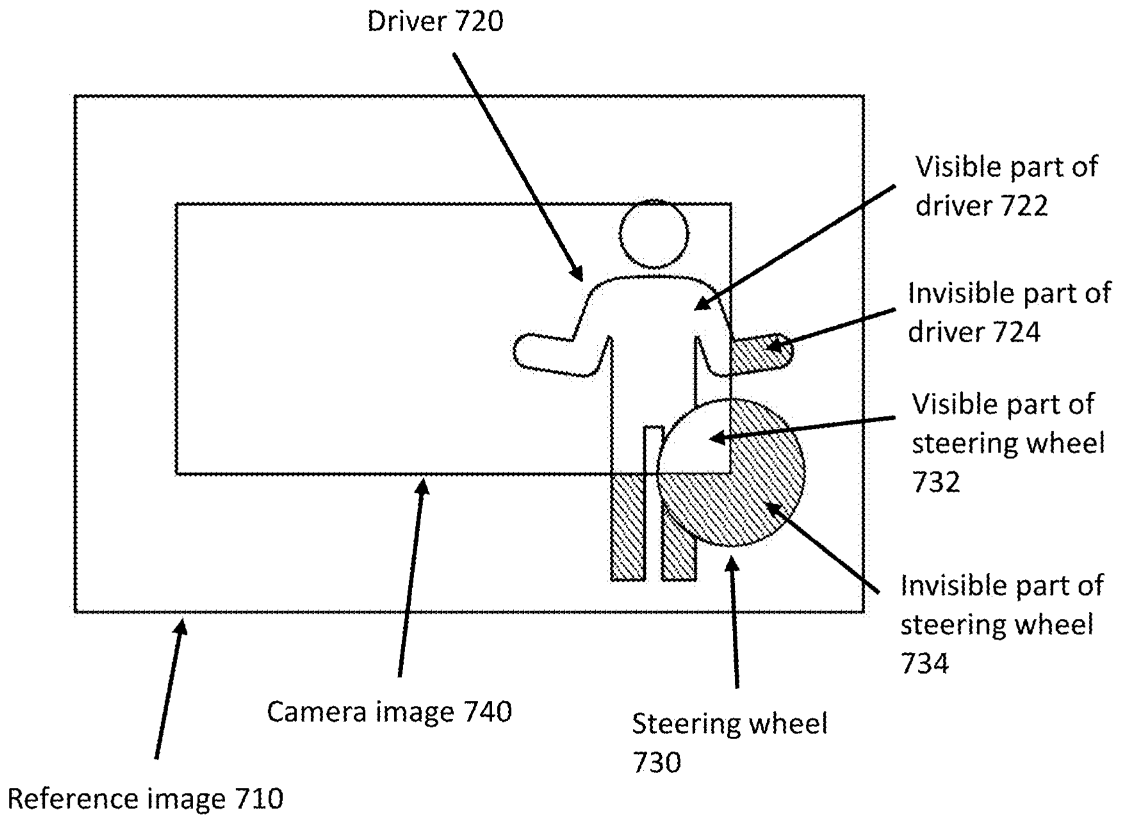

An example reference image is shown in FIG. 7B. The reference images 710 capture an area of the interior of the vehicle that is larger than the area that the camera captures. That is, the size of the reference images 710 is larger than the size of the image taken by the camera (i.e., camera image 740) and used for methods 100, 200 according to FIGS. 1 and 2. The reference images 710 capture the driver 720 and the steering wheel 730.

The classification network is trained with the reference images 710 to identify visible parts of the driver 722 and/or visible parts of the steering wheel 732 in the camera image 740, as well as part of the driver and steering wheel that are visible in the reference image 710 but not in the camera image 740 (i.e., part of the driver and the steering wheel visible in the reference image only but invisible in the camera image 724, 734). In other words, the classification network is trained such that it can detect and classify parts of the steering wheel or driver that are visible in the camera image.

To classify, the camera image 740 is first expanded (i.e., augmented) to the size of the reference images 710. An example camera image 740 is shown in FIG. 7A. The camera image 740 is generated by the camera 750 and captures a portion of the interior of the vehicle 760. Only parts of the driver 722 or parts of the steering wheel 732 are visible in the camera image 740. Other parts of the steering wheel 734 or driver 724 are outside the camera image 740 and are therefore not visible in the camera image 740.

The augmented camera image 745 is then classified using the classification network, thereby detecting and classifying the visible parts of the steering wheel 732 or driver 722 in the augmented camera image 745. Based on the classified parts of the steering wheel 732 or driver 722 that are visible in the camera image 740, the classification network is trained to estimate and classify parts of the steering wheel 734 or driver 724 that are not visible in the camera image 740 as such. As a result, the camera image 740 in which only parts of the steering wheel 732 or driver 722 are visible is expanded in size to include parts of the steering wheel 734 or driver 724 that are not visible in the camera image 740 but are visible in the augmented camera image 745.

Figure 7C:
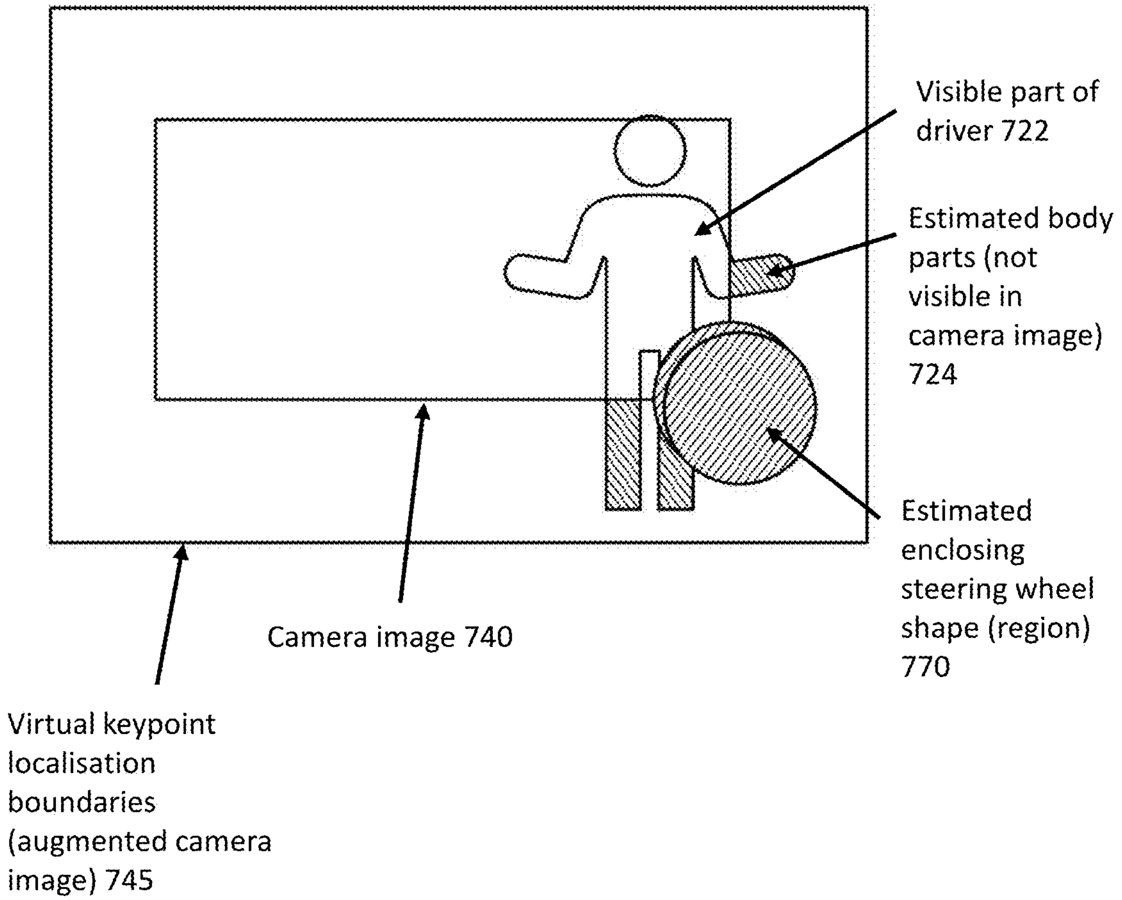

An example augmented camera image 745 is shown in FIG. 7C. Using the classification network, the visible parts of the driver 722 or steering wheel are classified, and based on this, non-visible parts of the driver 724 or steering wheel are detected (i.e., estimated). The augmented camera image 745 thus corresponds to a virtual image in which invisible parts can be estimated and thus associated body keypoints and their locations can be detected.

Based on the classification of the augmented camera image 745 as shown in FIG. 7C (i.e., based on the parts 722, 732 visible in the camera image 740 as well as the estimated parts 724, 734 not visible in the camera image 740), the region 770 including the steering wheel can then be determined, as described above with reference to activity 120 in FIG. 1 and block 220 in FIG. 2. Thus, the determination of the region 770 is based not only on parts 722, 732 visible in the camera image 740 but also on parts 724, 734 not visible in the camera image 740, resulting in an improvement with respect to the accuracy of the determination. In addition, especially in connection with the determination of the hand pose or the body pose, the method described above allows a location of the hand belonging to an arm but not visible in the camera image to be determined or estimated on the basis of the parts of the driver visible in the camera image (e.g., the arm of the driver). This allows an improved estimation of whether the driver is operating the steering wheel, at least with a certain confidence.

Figure 8:
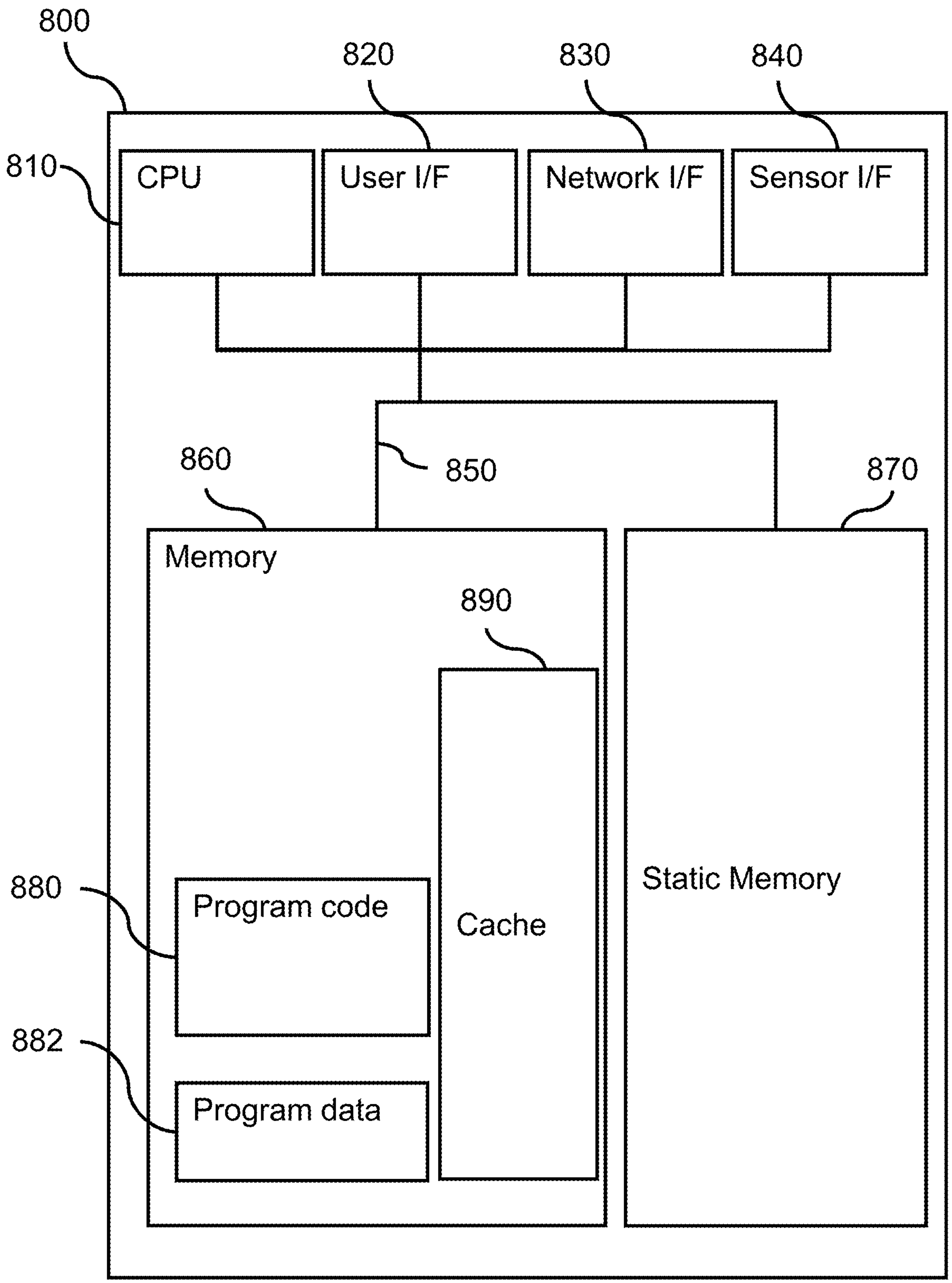
FIG. 8 is a diagrammatic representation of internal components of a computing system implementing the functionality as described herein.

FIG. 8 is a diagrammatic representation of internal components of a computing system 800 implementing the functionality as described herein.

The computing system 800 may be in the vehicle and includes at least one processor 810, a user interface 820, a network interface 830 and a main memory 860, that communicate with each other via a bus 850. Optionally, the computing system 800 may further include a static memory 870 and a disk-drive unit (not shown) that also communicate with each via the bus 850. A video display, an alpha-numeric input device and a cursor control device may be provided as examples of the user interface 820.

Furthermore, the computing system 800 may also comprise a sensor interface 840 to communicate with a sensor of the vehicle. Alternatively, the computing system 800 may communicate with the sensor via the network interface 830. The sensor obtains the image. The sensor may be a radar sensor, a laser scanner, a light detection and ranging (Lidar) sensor, or the like. The computing system 800 may also be connected to database systems (not shown) via the network interface 830, wherein the database systems store additional data needed for providing the functionalities as described herein.

The main memory 860 may be a random-access memory (RAM) and/or any further volatile memory. The main memory 860 may store program code 880 for performing the example method described herein. The memory 860 may also store additional program data 882 required for providing the functionalities as described herein. Part of the program data 882 and/or the program code 880 may also be stored in a separate, e.g., cloud memory and executed at least in part remotely. In such an example embodiment, the memory 860 may store the segment encoding module and the correlation encoding module as described herein in a cache 890.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the art. In particular, the examples are offered by way of illustrating the principles, and to provide a number of specific methods and arrangements for putting aspects of the subject disclosure into effect.

In certain embodiments, the functions and/or acts specified in the flow charts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the subject disclosure. It will be further understood that the terms "comprise" and/or "comprising," when used in this specification, specify the presence of stated features, integers, activities, operations, elements, and/or components, but do not preclude the presence or addition of one or more other features, integers, activities, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all the subject disclosure and while these embodiments have been described in considerable detail, it is not the intention to restrict or in any way limit the scope of the appended claims to such detail. Additional advantages and modifications will readily appear to those skilled in the art.

The subject disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship encompasses a direct relationship where no other intervening elements are present between the first and second elements as well as an indirect relationship where one or more intervening elements are present between the first and second elements.

As noted below, the term “set” generally means a grouping of one or more elements. However, in various implementations a “set” may, in certain circumstances, be the empty set (in other words, the set has zero elements in those circumstances). As an example, a set of search results resulting from a query may, depending on the query, be the empty set. In contexts where it is not otherwise clear, the term “non-empty set” can be used to explicitly denote exclusion of the empty set that is, a non-empty set will always have one or more elements.

A “subset” of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term “proper subset” can be used to explicitly denote that a subset of the first set must exclude at least one of the elements of the first set. Further, in various implementations, the term “subset” does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term “non-empty subset” can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” can be replaced with the term “controller” or the term “circuit.” In this application, the term “controller” can be replaced with the term “module.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for driving assistance in a vehicle, the method comprising:

determining, based on an image capturing an operating element of the vehicle and a driver of the vehicle, a distance between the operating element and a hand of the driver; and in response to the distance meeting a criterion that is indicative of a possibility that the driver operates the operating element:

determining, based on a part of the image capturing the operating element, classification information of the operating element;

determining, based on a part of the image capturing the driver, classification information of a pose of the driver, wherein determining classification information of the pose of the driver includes:

classifying, using a classification network for detecting a body pose of the driver, the driver captured in the image to detect the body pose of the driver; and determining, based on the classifying, the classification information indicating whether the body pose of the driver is to allow the driver to operate the operating element; and determining, based on the distance, the classification information of the operating element and the classification information of the pose of the driver, whether the driver operates the operating element.

2. The computer-implemented method of claim 1 further comprising:

defining a region in the image including at least a part of the operating element or detecting, using a detection network trained to locate parts of the operating element, the region including at least the part of the operating element; and determining, based on the region, the location of the operating element.

3. The computer-implemented method of claim 2 further comprising:

determining, based on a plurality of body keypoints of the driver, one or more body keypoints indicating the hand of the driver; and determining, based on the one or more body keypoints, the location of the hand.

4. The computer-implemented method of claim 1 wherein determining classification information of the operating element includes:

classifying, using a classification network for detecting operating of the operating element, the part of the image to detect whether the hand of the driver is located proximate to the operating element so as to allow operating the operating element; and determining, based on the classifying, the classification information of the operating element indicating whether the driver operates the operating element.

5. The computer-implemented method of claim 4 wherein the classification network for detecting operating of the operating element is trained to detect whether the hand of the driver captured in the image can be located proximate to the operating element.

6. The computer-implemented method of claim 1 wherein the classification network of the body pose of the driver is trained to detect, based on a plurality of body keypoints of the driver, body poses of the driver captured in the image.

7. The computer-implemented method of claim 1 wherein determining classification information of the pose of the driver includes:

classifying, using a classification network for detecting a hand pose of the driver, the driver captured in the image to detect the hand pose of the driver; and determining, based on the classifying, the classification information indicating whether the hand pose of the driver is to allow operating the operating element.

8. The computer-implemented method of claim 7 wherein the classification network for detecting the hand pose of the driver is trained to detect, based on a plurality of body keypoints related to the hand of the driver, hand poses of the driver captured in the part of the image.

9. The computer-implemented method of claim 2 further comprising:

cropping, based on the location of the operating element, the image to generate the part of the image capturing the operating element.

10. The computer-implemented method of claim 2 further comprising:

cropping, based on a plurality of body keypoints of the driver and/or using a classification network for detecting at least a part of the driver in the image, the image to generate the part of the image capturing at least the part of the driver.

11. The computer-implemented method of claim 1 further comprising:

generating a control signal for driving assistance indicating whether the driver operates the operating element.

12. A processing apparatus comprising:

a processor configured to perform a method including:

determining, based on an image capturing an operating element of a vehicle and a driver of the vehicle, a distance between the operating element and a hand of the driver; and in response to the distance meeting a criterion that is indicative of a possibility that the driver operates the operating element:

determining, based on a part of the image capturing the operating element, classification information of the operating element;

determining, based on a part of the image capturing the driver, classification information of a pose of the driver, wherein determining classification information of the pose of the driver includes:

classifying, using a classification network for detecting a body pose of the driver, the driver captured in the image to detect the body pose of the driver; and determining, based on the classifying, the classification information indicating whether the body pose of the driver is to allow the driver to operate the operating element; and determining, based on the distance, the classification information of the operating element and the classification information of the pose of the driver, whether the driver operates the operating element.

13. A non-transitory computer-readable medium comprising instructions including:

determining, based on an image capturing an operating element of a vehicle and a driver of the vehicle, a distance between the operating element and a hand of the driver; and in response to the distance meeting a criterion that is indicative of a possibility that the driver operates the operating element:

determining, based on a part of the image capturing the operating element, classification information of the operating element;

determining, based on a part of the image capturing the driver, classification information of a pose of the driver, wherein determining classification information of the pose of the driver includes:

classifying, using a classification network for detecting a body pose of the driver, the driver captured in the image to detect the body pose of the driver; and determining, based on the classifying, the classification information indicating whether the body pose of the driver is to allow the driver to operate the operating element; and determining, based on the distance, the classification information of the operating element and the classification information of the pose of the driver, whether the driver operates the operating element.

* * * * *